United States Patent
Rigollet et al.

(10) Patent No.: US 9,593,788 B2
(45) Date of Patent: Mar. 14, 2017

(54) CLAMPING COLLAR

(71) Applicant: ETABLISSEMENTS CAILLAU, Issy les Moulineaux (FR)

(72) Inventors: Nicolas Rigollet, Romorantin (FR); Fabrice Prevot, Selles sur Cher (FR)

(73) Assignee: Etablissements Caillau, Issy les Moulineaux (FR)

(*) Notice: Subject to any disclaimer, the term of this patent is extended or adjusted under 35 U.S.C. 154(b) by 0 days.

(21) Appl. No.: 14/391,954

(22) PCT Filed: Apr. 10, 2013

(86) PCT No.: PCT/FR2013/050770
§ 371 (c)(1),
(2) Date: Oct. 10, 2014

(87) PCT Pub. No.: WO2013/153323
PCT Pub. Date: Oct. 17, 2013

(65) Prior Publication Data
US 2015/0074952 A1    Mar. 19, 2015

(30) Foreign Application Priority Data

Apr. 13, 2012  (FR) .................................... 12 53413

(51) Int. Cl.
*F16L 33/10*    (2006.01)
*F16L 21/06*    (2006.01)
(Continued)

(52) U.S. Cl.
CPC ............ *F16L 33/10* (2013.01); *F16L 21/065* (2013.01); *F16L 23/02* (2013.01); *F16L 23/08* (2013.01);
(Continued)

(58) Field of Classification Search
CPC . F16L 33/10; F16L 23/08; F16L 33/04; F16L 23/02; F16L 21/065; Y10T 24/1412; Y10T 24/1443
See application file for complete search history.

(56) References Cited

U.S. PATENT DOCUMENTS 2,651,095 A * 9/1953 Kates ...................... F16L 33/04
                                                    24/279
2,677,164 A * 5/1954 Stade ....................... F16L 33/04
                                                    24/279
(Continued)

FOREIGN PATENT DOCUMENTS

| DE | 4119171 A1 | 1/1992 | |
|----|----|----|----|
| FR | WO 2010004233 A1 * | 1/2010 | ............ F16L 21/065 |
| WO | WO2006/109001 A1 | 10/2006 | |

OTHER PUBLICATIONS

International Search Report mailed Oct. 6, 2013 for PCT Application No. PCT/FR2013/050770, 2 pages.

*Primary Examiner* — Robert J Sandy
*Assistant Examiner* — Louis Mercado
(74) *Attorney, Agent, or Firm* — Lee & Hayes, PLLC (57) ABSTRACT

The collar has a metal belt (10), a pair of projecting lugs (12, 14), a tightening rod (16) disposed in holes in the lugs, and tightening members (16A, 16B) co-operating with the rod and with bearing portions of the lugs. At least one of the lugs in the pair is a lug (14) having an extension, the bearing portion of which lug is formed in an extension (17) of the lug, which extension is folded over towards the rear of the lug, and is provided with a hole for the tightening rod. The extension (17) and the front portion (15) of the lug (14) having an extension are interconnected via a strip portion (20) forming a link loop defining an axial tunnel having its two axial ends open, the tunnel being shaped so that the angle of inclination between the extension (17) and the front portion (15) of the lug can change when the collar is tightened.

20 Claims, 6 Drawing Sheets

(51) Int. Cl.
*F16L 23/02* (2006.01)
*F16L 23/08* (2006.01)
*F16L 33/04* (2006.01)

(52) U.S. Cl.
CPC ........... *F16L 33/04* (2013.01); *Y10T 24/1412* (2015.01); *Y10T 24/1443* (2015.01)

(56) References Cited

U.S. PATENT DOCUMENTS

| | | | | |
|---|---|---|---|---|
| 2,806,276 | A * | 9/1957 | Cooper | F16L 33/04 24/279 |
| 2,835,954 | A * | 5/1958 | Dahl | F16L 33/04 24/279 |
| 3,038,230 | A * | 6/1962 | Henning | F16L 33/04 24/282 |
| 3,064,327 | A * | 11/1962 | Kaplan | F16L 33/04 24/279 |
| 8,042,234 | B2 * | 10/2011 | Rigollet | F16B 2/065 24/19 |
| 2008/0184536 | A1 * | 8/2008 | Rigollet | F16B 2/065 24/279 |
| 2010/0223764 | A1 * | 9/2010 | Prevot | F16L 23/08 24/279 |
| 2010/0257702 | A1 * | 10/2010 | Fritskey | F16L 33/04 24/20 R |

* cited by examiner

CLAMPING COLLAR

CROSS-REFERENCE TO RELATED APPLICATIONS

This Application is the National Stage of International Application No. PCT/FR2013/050770, filed Apr. 10, 2013, which claims priority to French Patent Application No. 1253413, filed Apr. 13, 2012, the entire disclosures of which are incorporated herein by reference.

The present invention relates to a clamping collar having a substantially cylindrical metal belt, a pair of projecting lugs having respective facing front portions, a tightening rod disposed in holes in said lugs, and two tightening members co-operating with said rod and with respective ones of bearing portions of the two lugs in the pair to move the lugs closer together in such a manner as to cause the belt to be tightened by reducing the diameter of said belt, at least one of the lugs in the pair being a lug having an extension, the bearing portion of said lug being formed in an extension of said lug, which extension is folded over towards the rear of said lug, away from the other lug in the pair, and is provided with a hole for the tightening rod, which hole is situated facing a hole in the front portion of the same lug, a bracing space being provided between the folded-over extension and said front portion.

A collar of this type is known, for example, from Patent Application PCT WO 2006/109001 and from Patent Application PCT WO 2010/004233.

Those collars are generally satisfactory, in particular when it is desired for the clamping lugs to be of high stiffness. In particular, as indicated in Application WO 2006/109001, exerting tightening forces on the extension of the lug, rather than on its front portion, makes it possible to limit the deformation of said front portion during the tightening, thereby preserving the circularity of the collar to a certain extent. However, in the above-mentioned documents, the extension is connected rigidly to the front portion of the lug. As a result, in reality, high tightening forces exerted on the extension are transmitted to the front portion of the lug that is thus stressed in deformation, in spite of the fact that the tightening forces are exerted primarily on the extension.

An object of the invention is to improve that state of the art, by further reducing the risks of the front portion of the lug deforming under the effect of the tightening forces.

This object is achieved by the fact that the extension and the front portion of the lug having an extension are interconnected via a strip portion forming a link loop defining an axial tunnel having its two axial ends open, said tunnel being shaped so that the angle of inclination between the extension and the front portion of the lug having an extension can change when the collar is tightened.

With the invention, for the lug having an extension, the following are identified: the front portion proper; the extension proper; and, between these two portions, the tunnel-shaped link loop. Thus, during tightening, the extension can be deformed in such a manner as to be inclined relative to the front portion of the lug, by acting on the flexibility of the link loop. During tightening, the curvature of the link loop is changed to enable the angle of inclination between the extension and the front portion of the lug to vary without stressing said front portion in deformation. In other words, the link loop is less stiff than the front portion and than the extension.

Advantageously, for the lug having an extension, one of the elements constituted by the extension and by the front portion carries at least one holding tab folded over into the tunnel via one of its open axial ends.

This holding tab, of extremely simple shape, makes it possible to retain the relative positions of the front portion and of the extension in the tunnel. In other words, it prevents the extension from tending to rise radially relative to the lug under the effect of being deformed due to the tightening. This ensures that the relative positions of the hole in the front portion and of the hole in the extension remain optimum for avoiding over-stressing the tightening rod in bending, under the effect of the tightening forces.

Advantageously, for the lug having an extension, at least one of the elements constituted by the extension and by the front portion has at least one bracing cheek that extends towards the other of said elements, substantially parallel to the tightening rod.

This bracing cheek contributes to the stiffness of the element that it equips (extension or front portion of the lug) while the link loop remains flexible. When the bracing cheek is a side cheek, its outside radial edge defines the inside radial edge of the tunnel formed by the link loop.

Advantageously, the extension has two bracing side cheeks, while the front portion of the lug having an extension has two stiffening lips that extend towards the extension and that are formed on respective ones of the two axially opposite edges of said front portion, and the free edges of the bracing side cheeks extend against the inside faces of respective ones of said lips.

The side cheeks stiffen the extension, while the stiffening lips stiffen the front portion of the lug. Conversely, the link loop does not have any lip or cheek, and thus constitutes a zone of greater flexibility than the extension or the front portion of the lug.

Advantageously, with the belt of the collar being of convex section as seen from the outside, the extension has two bracing side cheeks that extend towards the axis of the collar beyond the crest of said section, on either side of said crest.

Thus, the side cheeks contribute to retaining the lug relative to the belt of the collar, by avoiding movements of the lug relative to the belt, along the axis of the collar. These lugs are all the more effective since they are themselves retained against the above-mentioned lips of the front portion of the lug.

Advantageously, the extension has bracing cheeks formed by die-stamping.

Thus, the bracing cheeks of the extension may be formed in a single stamping operation. The major work-hardening that results further improves the stiffness of the extension.

Advantageously, the front portion of the lug having an extension has two stiffening lips that extend towards the extension and are formed on respective ones of the two axially opposite edges of said front portion, and the end of each lip that is further from the axis of the collar carries a holding tab that is folded over into the axial tunnel.

The holding tabs may thus be formed by radial additional segments of the stiffening lips, which additional segments are folded over into the axial tunnel, on either side thereof. The structure of the collar can thus be symmetrical, and the extension is retained on both of its axial sides.

Advantageously, both of the lugs in the pair are lugs that have extensions and that are shaped analogously to each other.

Thus, each lug has a front portion (the two front portions face each other) and an extension, the extensions being connected to the front portions via tunnel-shaped flexible link loops. During tightening, the deformations due to the tightening force and to the reduction in the diameter of the collar are thus distributed between the respective extensions of each lug, which, in particular, offers the advantage of limiting the sag stresses that are exerted on the tightening rod.

Advantageously, with the tightening rod being threaded, the hole in the extension of the lug having an extension (or in one of the lugs having extensions, if both lugs have extensions) has a tapped neck co-operating, by screwing, with the tightening rod while said rod is mounted loosely through the hole in the front portion of said lug.

By means of these features, it is not necessary to use a nut that is separate from the collar in order to tighten the tightening rod. The clamping collar can thus be constituted merely by the belt of the collar, with its two lugs having extensions, and by a bolt. The head of the bolt bears against the extension of one of the lugs, while the threaded shank of the bolt screws into the tapped neck of the extension of the other lug. As indicated above, during the tightening, the angle of inclination of the extension changes by itself, by means of the flexibility imparted by the tunnel-shaped link loop. Thus, the threads of the screw remain fully engaged in the threads of the tapped neck of said extensions, without deforming out of round under the effect of the tightening tension. Insofar as the tapped neck is situated in the deformable extension, which is inclined naturally under the effect of the diameter of the collar being reduced, the tightening forces are exerted only along the axis of the tightening rod. During the tightening of the collar, in particular when it is a collar of relatively small diameter and when it is to be opened quite wide in order to put it into place on the article to be clamped, the angular positioning of the lugs varies considerably between the "collar open" state and the "collar closed" state. The fact that the tapped neck is integral with the extension that is of inclination that can vary relative to the inclination of the lug makes it possible to ensure that, in spite of the variation in the angular positioning of the lugs, the axis of the neck remains aligned with the axis of the tightening rod throughout the tightening stage.

Advantageously, the hole in the front portion of the lug having an extension has a skirt forming a bearing for the tightening rod.

This skirt contributes to supporting the tightening rod during the tightening, for the purpose of further limiting the sag stresses that are exerted on said rod.

Advantageously, the link loop has greater flexibility than the extension and than the front portion of the lug having an extension.

It is even possible to make provision for the link loop to be suitable for being broken.

Advantageously, the link loop has a width, measured in the axial direction of the collar, that is less than the widths of the extension and of the front portion of the lug having an extension.

This greater flexibility of the link loop may be imparted to it by a smaller thickness or, above all, by a smaller width relative to the width of the front portion of the lug and of the extension, these widths being measured along the axis of the collar. The link loop may be in the form of a looped filament, the width of which is of the same order of magnitude as the thickness, as measured radially. If necessary, for connecting the extension of a lug to its front portion, it is possible to provide one or more link loops formed in this way.

Advantageously, when the collar is in the non-tightened state, the open axial ends of the tunnel defined by the link loop have a radius of curvature lying in the range 0.25 times the radius of the tightening rod to 1.5 times the radius of said tightening rod.

The Applicant has observed that this range of values for the radius of curvature of the loop link imparts the desired stiffness to it, given the dimensioning of the tightening rod.

The invention can be well understood and its advantages appear more clearly on reading the following detailed description of embodiments shown by way of non-limiting example. The description refers to the accompanying drawings, in which.

Firstly, the first embodiment of the collar is described with reference to FIGS. 1 and 2. This collar comprises a metal belt 10 that is substantially cylindrical, and that is provided with a pair of projecting lugs, respectively 12 and 14. These lugs 12 and 14 project substantially radially relative to the belt 10, the radial direction being determined relative to the axis A of the collar.

These lugs 12 and 14 have respective front portions 13 and 15 that face each other. The collar further comprises a tightening rod 16 that is disposed in holes in the lugs. In this example, the rod is in the form of a bolt with a head 16A that bears against the lug 14, and a nut 16B that bears against the lug 12.

Figure 1:
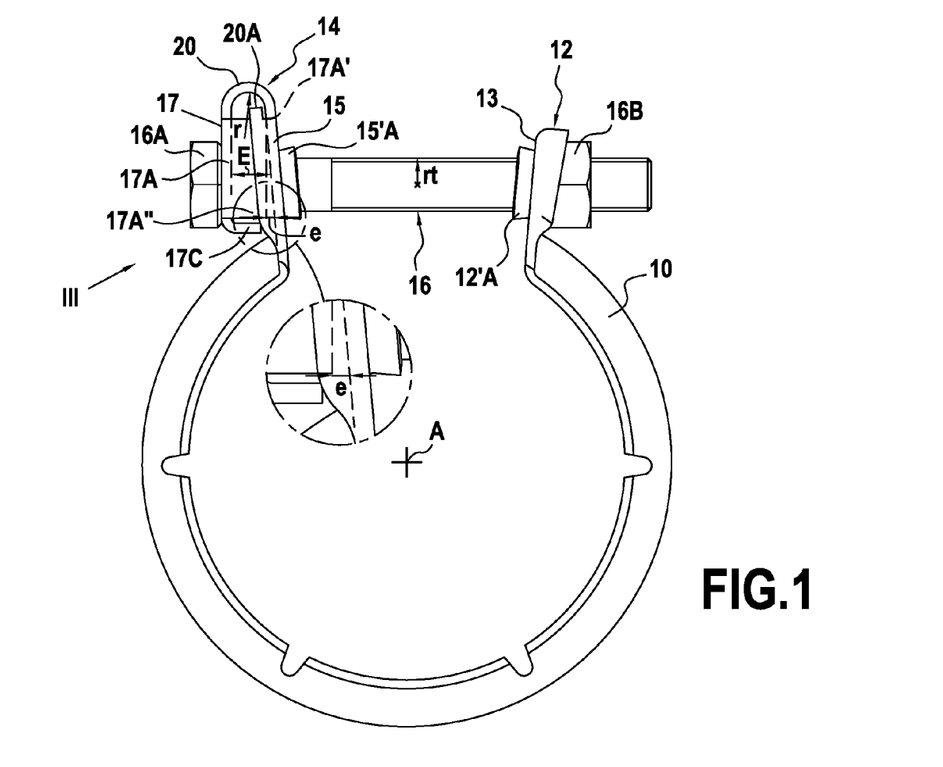
FIG. 1 is a side view of a collar of the invention, in the non-tightened state.
Figure 2:
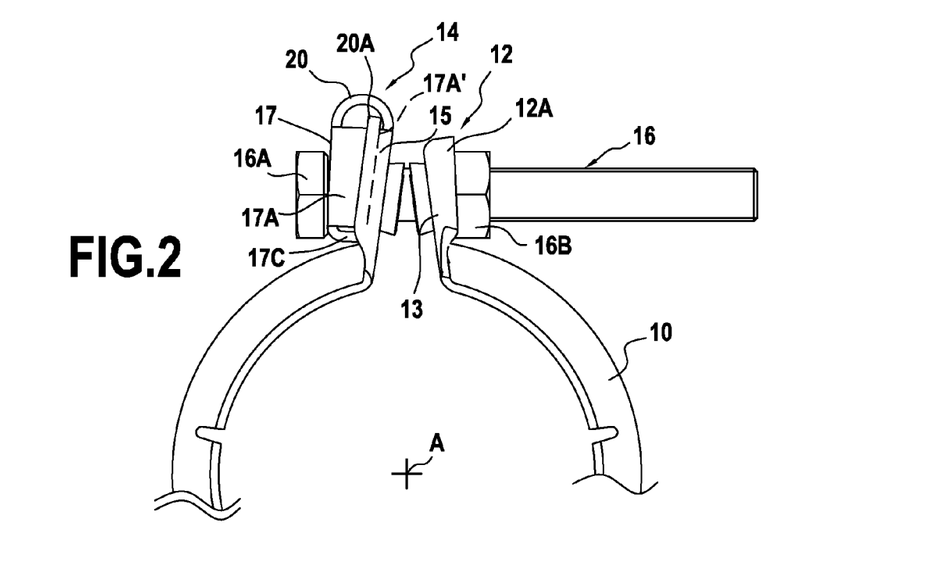
FIG. 2 is a view of the FIG. 1 collar in the tightened state.

By comparing FIGS. 1 and 2, it can be understood that the collar can be tightened by turning the bolt 16, in such a manner as to bring the lugs 12 and 14 closer together, thereby reducing the diameter of the collar. In this example, the lug 12 is a single lug, the nut 16B co-operating with the rear face, i.e. that face of the lug 12 that faces away from the lug 14. It can be seen that the lug 12 has a rearwardly extending peripheral lip 12A, with flats adapted to match the shape, e.g. hexagonal, of the nut 16B, so as to prevent said nut from turning. Therefore, the bolt 16A is tightened by turning its head.

In any event, for the lug 12, the bearing portion with which the tightening member constituted by the nut 16B in this example co-operates is formed by the rear face of said lug that faces away from its front portion 13.

Conversely, the lug 14 is a double lug. More precisely, it is a lug having an extension 17 and that has its bearing portion formed in said extension, which is folded over towards the rear of said lug, i.e. away from the other lug 12.

Figure 3:
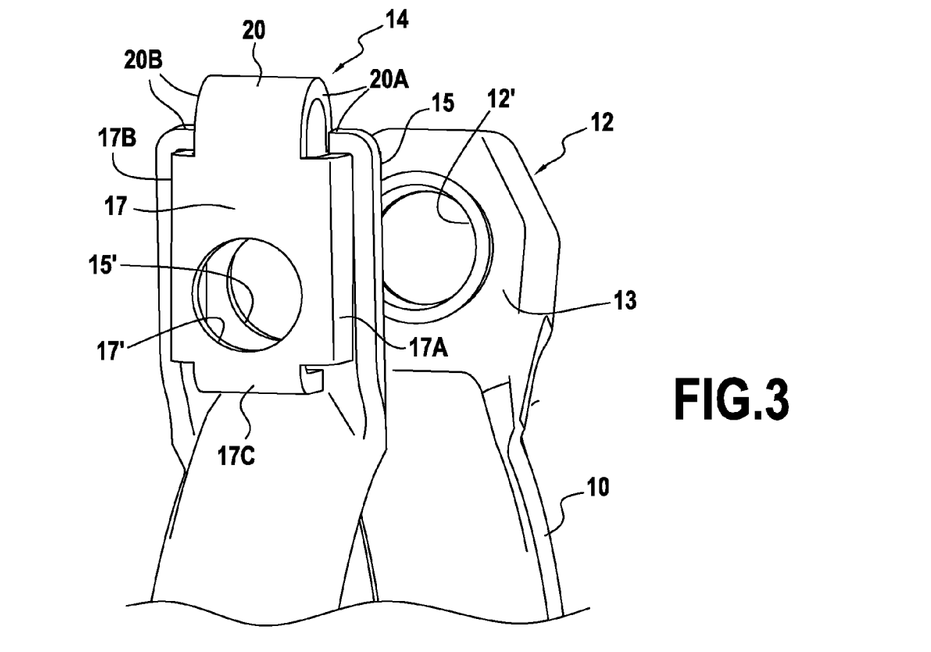
FIG. 3 is a perspective view of the FIG. 1 collar, without the tightening rod, seen looking along arrow III of FIG. 1.

As can be seen in FIG. 3, the lug 12 is provided with a hole 12', the front portion 15 of the lug 14 is provided with a hole 15' and the folded-over extension 17 of the lug 14 is provided with a hole 17', these holes being aligned so that the tightening rod can pass through them. A bracing space E is provided between the folded-over extension 17 and the front portion 15 of the lug 14. In this example, the extension 17 is provided with bracing cheeks, respectively 17A, 17B, and 17C. The width of the bracing space E, as measured along the direction of the tightening rod 16, is dependent on the width of the bracing cheeks, as measured along the same direction.

The two side cheeks 17A and 17B are disposed on the two sides of the extension 17, as considered along the axis A. It can be seen in FIG. 1 that the top edge 17A' of the cheek 17A comes substantially into contact with the rear face of the front portion of the lug 15. Conversely, like the edge of the bottom cheek 17C, the bottom edge 17A" of said cheek 17A is a small distance apart from the rear face of said front portion 15. The bracing space E thus has its width increased by that small distance e in the bottom region, between the cheeks 17A, 17B, and 17C, and the rear face of the front portion 15. Conversely, in FIG. 2, the angle of inclination between the extension 17 and the front portion 15 of the lug 15 has been modified, and it can be seen that the bottom edge 17A" of the side cheek 17A, and the edge of the bottom cheek 17C are in contact with the rear face of the front portion 15 of the lug, while the top edge 17A' of the cheek 17 is a small distance away from said rear face.

In the meaning of the present patent application, the elements of the lugs that are defined as "top" or "upper" are the elements that are further away from the axis A of the collar, while the "bottom" or "lower" elements are the ones that are closer to said axis. The extension 17 and the front portion 15 of the lug 14 are interconnected via a strip portion 20 that, as can be seen in particular in FIGS. 1 to 3, forms link loop defining an axial tunnel having its two axial ends, respectively 20'A and 20'B open. By comparing FIG. 1, prior to tightening the collar, with FIG. 2, after such tightening, it can be observed that, during the tightening, the curvature of the link loop 20 has changed: the link loop 7 has become flatter and its radius of curvature has increased. It can also be seen in FIGS. 1 to 3 that the extension 17 of the lug 14 carries two holding side tabs, respectively 20A and 20B, that are folded over into the tunnel formed by the link loop 20, via respective ones of its axial ends.

In the initial state, prior to tightening the collar, the link loop is in the shape of a half-cylinder having its axis in the midplane between the rear face of the front portion 15 of the lug and the facing face of the extension.

Figure 4:
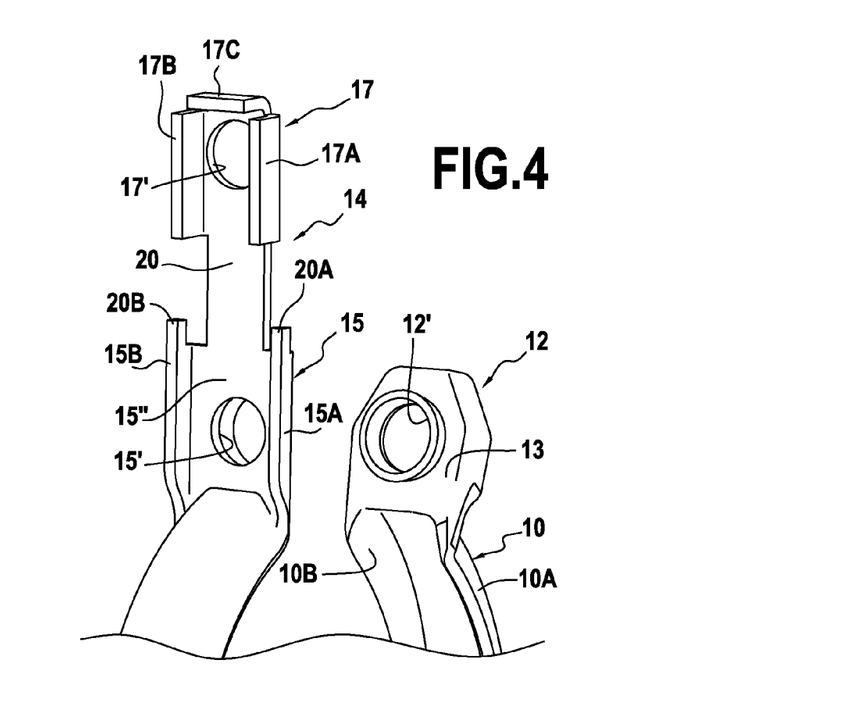
FIG. 4 is a view corresponding to the FIG. 3 view, showing a manufacturing step.

FIG. 4 shows the collar of the preceding figures before the extension 17 is folded over. In this state, said extension 17 extends radially in rectilinear alignment with the front portion 15 of the lug, and the intermediate portion that is designed to form the link loop 20 is then rectilinear. Similarly, the holding tabs 20A and 20B are then rectilinear.

In order to shape the extension and to bring it into the situation shown in FIG. 1, the link portion is folded over in such a manner as to form the link loop 20, until the side cheeks 17A and 17B are brought substantially against the rear face 15" of the front portion 15 of the lug. It can be seen that this front portion 15 has two stiffening lips, respectively 15A and 15B, each situated on a respective one of the sides of the front portion, as considered axially. The holding tabs 20A and 20B extend in alignment with said lips 15A and 15B. The lips 15A and 15B point rearwards, i.e. towards the position that the extension 17 takes up once it has been folded over.

Once the extension has been folded over, the free edges of the bracing side cheeks 17A and 17B extend against the inside faces of respective ones of the lips 15A and 15B. In other words, two side cheeks 17A and 17B are situated between the lips 15A and 15B.

The cheeks 17A, 17B, and 17C serve both to stiffen the extension 17, and to brace it relative to the rear face 15" of the front portion 15 of the lug 14.

In the example shown, the belt 10 of the collar has a recessed section, as seen from the inside, that is substantially V-shaped or U-shaped. Said belt 10 has two opposite side cheeks 10A and 10B that, starting from the outside periphery of the belt 10, extend towards the axis A. For example, this type of collar serves to clamp together two articles having projecting lips, coming to touch and to be inserted into the recessed portion of the belt 10 of the collar. Naturally, the invention is not limited to this type of configuration, and may also relate to collars having different sections, e.g. having flat sections.

Figure 5:
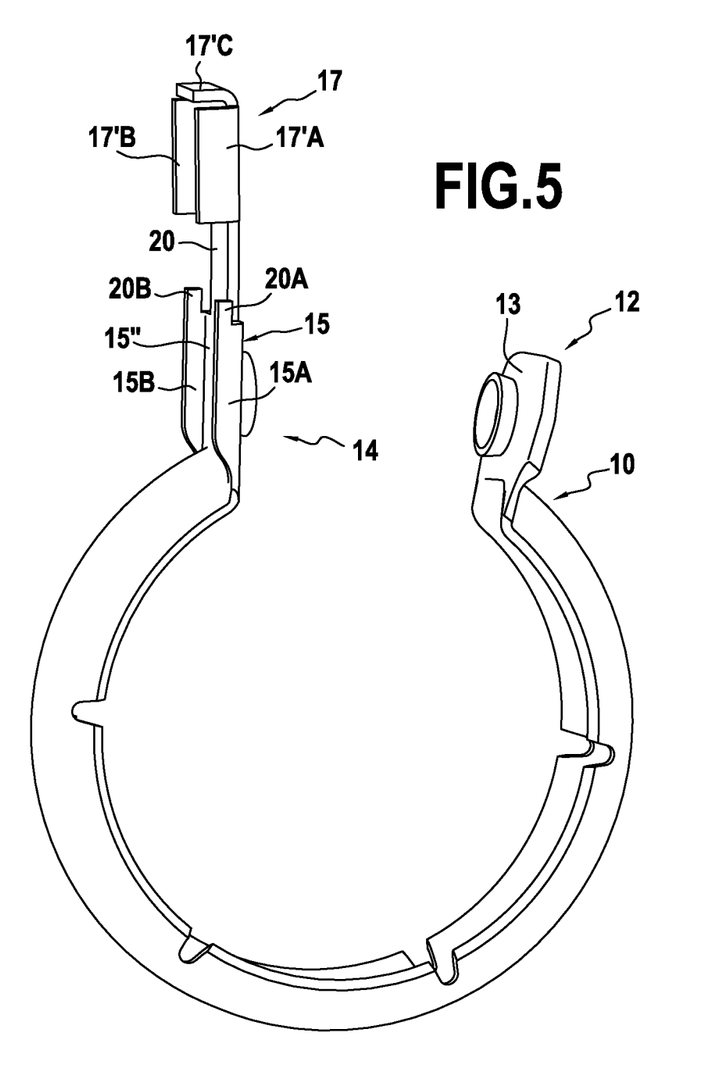
FIG. 5 is a view analogous to the FIG. 4 view, but showing a variant embodiment of the collar.

The collar of FIG. 5 is analogous to the collar of the above-described figures, except that the side cheeks 17'A and 17'B of the extension, and its bottom cheek 17'C, are formed by die-stamping. Thus, considered together, these three cheeks form a lip of the extension that, when it is folded over, extends towards the rear face 15" of the front portion 15 of the lug.

Figure 6:
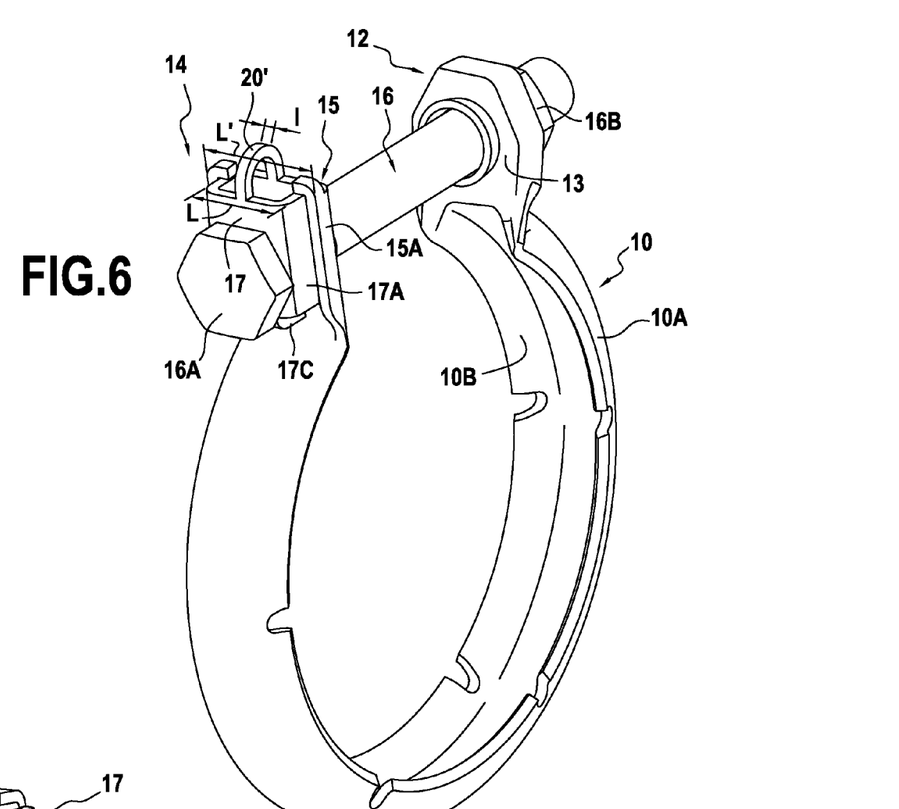
FIG. 6 is a perspective view of a collar of the invention, showing a variant embodiment.

The collar of FIG. 6 is analogous to the collar of FIGS. 1 to 4, except that the link loop 20' has a width l that is significantly less than the width L of the extension 17 and, in fact, has an almost filamentary shape. This loop 20' is deformed very easily during the shaping of the folding-over of the extension that serves to shape it, and, likewise, it is deformed very easily under the effect of the tightening forces. It can even go as far as to break during the tightening. For the purpose of further reinforcing its capacity to break, it could locally have a zone of weakness. Insofar as, as indicated above, the side cheeks 17A and 17B of the extension come to be received between the lips 15A and 15B of the front portion of the lug 14, the width L' of the front portion 15 of the lug is greater even that the width L of the extension. For example, the width l of the link loop 20' is about $\frac{1}{5}^{th}$ or $\frac{1}{4}$ of the width L of the extension 17.

Figure 7:
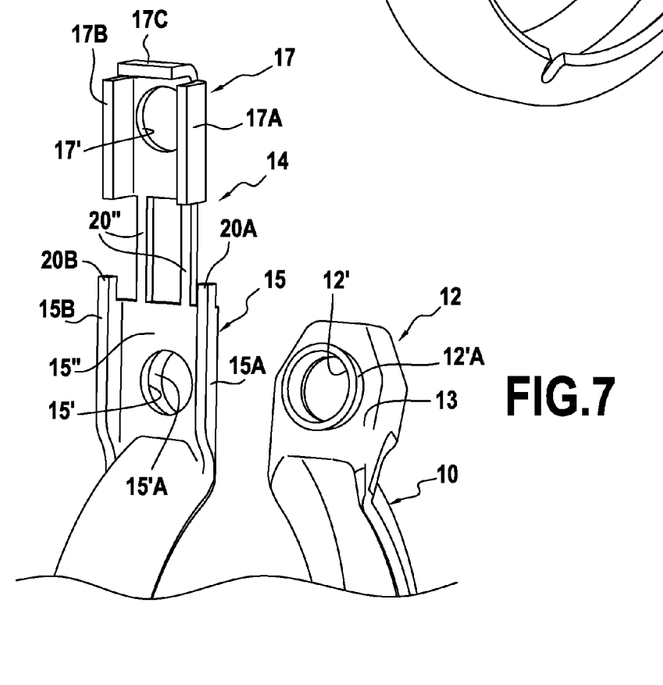
FIG. 7 is a view corresponding to the FIG. 5 view, but showing another variant embodiment.

FIG. 7 shows a collar of the same type as the collar of FIG. 6, in its configuration before the extension 17 is folded over. In FIG. 6, the link loop 20' of substantially filamentary shape, is centered in the midplane of the collar. In FIG. 7, the link loop is formed of two strands 20", of filamentary section, analogous to the second of the loop 20' of FIG. 6. These two strands are disposed symmetrically about the midplane of the collar containing the axis of the holes in the lugs.

It can also be seen in the figures that are described above that the hole 12' in the lug 12 has a skirt 12'A, and, likewise, the hole 15' in the front portion of the lug 14 has a skirt 15'A. These skirts form bearings for the tightening rod 16. In this example, the skirts 12'A and 15'A have frustoconical shapes, flaring going away from the front faces of the respective lugs, so as to allow the tightening rod 16, the lug 12, and the front portion 15 of the lug 14 to move angularly relative to one another while the collar is being tightened, such angular movement being due to the reduction in the diameter of the collar.

Figure 8:
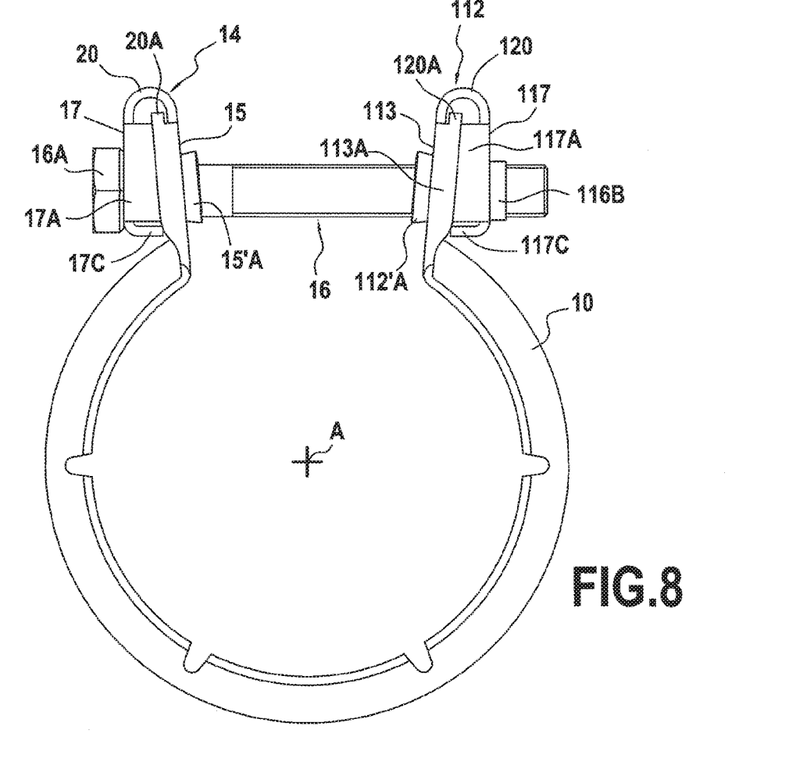
FIG. 8 is a side view of a second embodiment of the invention, in the non-tightened state.
Figure 9:
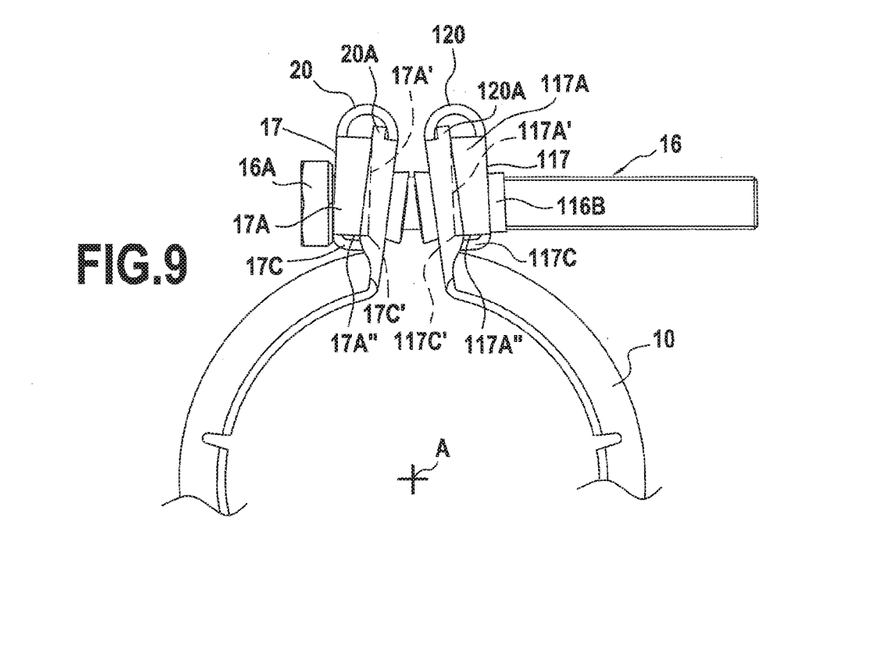
FIG. 9 is a side view of the FIG. 8 collar in the tightened state.
Figure 10:
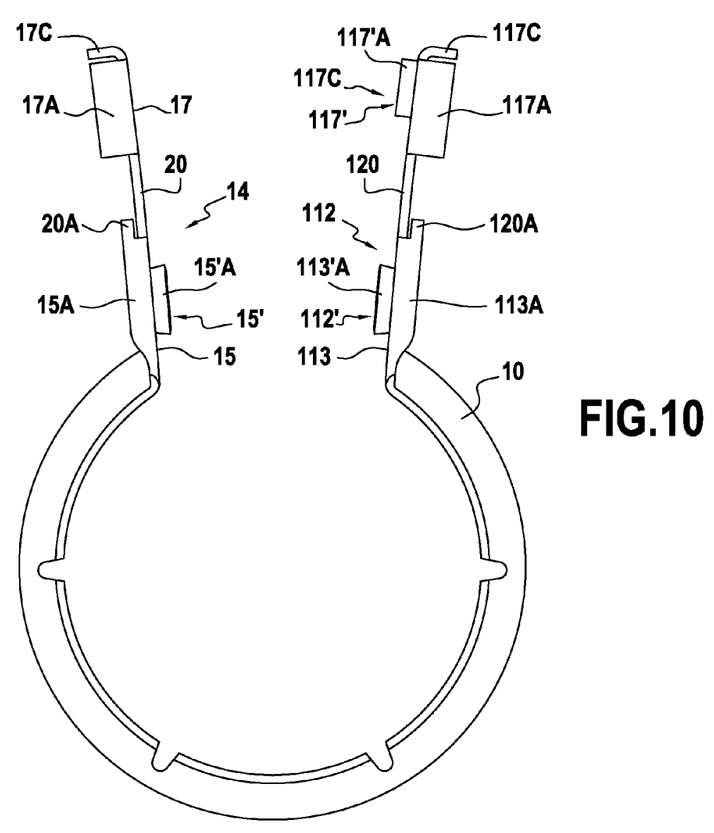
FIG. 10 is a side view of the collar of FIGS. 8 and 9, showing a manufacturing step.

With reference to FIGS. 8 to 10, a second embodiment of a clamping collar of the invention is described below. In this second embodiment, the belt 10 of the collar is unchanged, as is the lug 14 which, in the example shown, is analogous to the lug of FIGS. 1 to 4. The tightening rod 16, with its head 16A, is also unchanged. The second embodiment differs from the first embodiment firstly in that the first lug 112 is also a lug that has an extension, that is shaped substantially analogously to the lug 14, and secondly in that the nut 116B for the tightening rod 16 is incorporated in the extension of said first lug 112.

More precisely, the lug 112 has an extension 117, that is folded over towards the rear of said lug, away from its front portion 113. The extension 117 is analogous to the extension 17 that is described above, and as can seen, like that extension, it has side cheeks, only one of which (17A) is visible in the figures, and a bottom cheek 117C.

In the example shown, these cheeks are formed by folding, like the cheeks in FIGS. 1 to 4, but naturally they may be formed by die-stamping, as shown above with reference to FIG. 5.

The extension 117 is connected to the front portion 113 of the lug 112 via a strip portion 120 that forms a link loop analogous to the link loop 20 that is described above. Naturally, the loop 120 may be analogous to the above-described loops 20' and 20". The front portion 113 of the lug has lips analogous to the lips 15A that are described above, only the lip 113A being visible in the figures. As applies for the lug 14, the side cheeks of the extension 117 come to be received between the lips of the front portion 113 of the lug 112. Similarly, like the front portion 15 of the lug 14, the front portion 113 of the lug 112 has holding tabs, only one of which holding tabs 120A is visible in the figures. The front portion 113 of the lug 112 is also provided with a skirt 112'A that is analogous to the skirt 12'A described above with reference to the lug 12. It can be seen that the hole 117' in the extension 117 is provided with a tapped neck 117'A with which the tightening rod 16 co-operates by turning. Conversely, this rod is mounted loosely in the hole 112' in the lug 112 and in the hole 15' of the lug 14, in the same way as it is mounted loosely in the above-mentioned holes 12', 15', and 17' (in the figures, the hole in the extension 17 is not shown, but it is identical to the above-mentioned hole 17'). Thus, this tapped neck forms a nut for the tightening bolt 16.

In this example, the collar is made up of only two elements, namely the belt 10, with its lugs and their extensions that are formed integrally in one piece, and the tightening rod 16 with its head 16A formed integrally in one piece.

Prior to tightening, the bottom edges of the side cheeks of the extensions 17 and 117, and the edge of the bottom cheek 17C or 117C, are a small distance apart from the rear faces of the respective front portions 113 and 115. By comparing FIGS. 8 and 9, it can be understood that, after tightening, the angle of inclination of the extensions 17 and 117 relative to the front portions of the lugs has changed. In this configuration, the bottom edges of the side cheeks and the edge of the bottom cheek come into contact with the rear faces of the respective front portions 113 and 15, while the top edges of the side cheeks are a small distance apart from said rear faces. The figures show the top edges, respectively 17A' and 117A' of the cheeks 17A and 117A, the bottom edges, respectively 17A" and 117A" of the side cheeks, and the edges, respectively 17C' and 117C' of the bottom cheeks. By comparing FIGS. 8 and 9, it can also be seen that, during tightening, the curvature of the link loops 20 and 120 has changed, said loops having tended to flatten towards the axis A of the collar, their curvatures having increased. FIG. 10 shows that, initially, the extensions 17 and 117 extend substantially radially in alignment with respective ones of the front portions 15, 113 of the lugs 14, 112. The final steps of manufacturing the collar, starting from the situation shown in FIG. 10, consist in folding the extensions over towards the rears of the respective lugs, by acting on the flexibility of the strip portions forming the link loops, respectively 20 and 120. The holding tabs, respectively 20A and 120A, are initially in alignment with respective ones of the lips 15A and 113A, and said tabs are then folded over onto the top edges of the side cheeks of the respective extensions.

Figure 11:
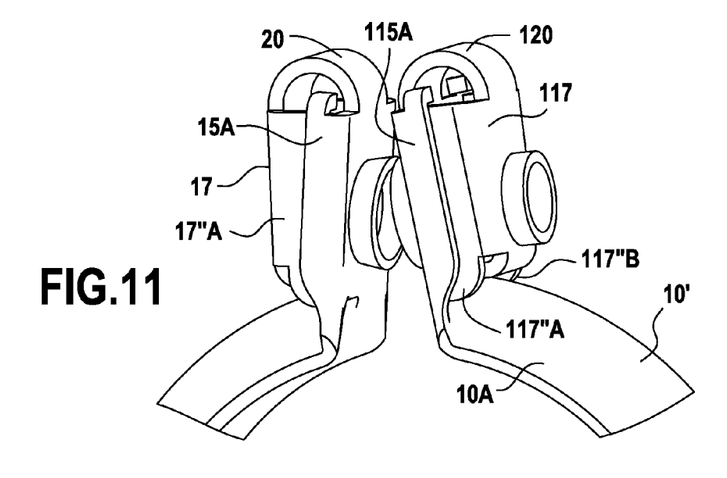
FIG. 11 is a detail view in the region of the extensions, showing a variant embodiment in perspective.

FIG. 11 shows a variant embodiment relating to the shaping of the bracing side cheeks. The belt of the collar 10 is of recessed section as seen from the inside, i.e. of convex section as seen from the outside, with a crest 10' and flanks 10A and 10B. The extensions 17 and 117 have bracing side cheeks, the cheek 17"A of the extension 17 and the cheeks 117"A and 117"B of the extension 117 being visible in FIG. 11. These side cheeks are analogous to those that are described above, except that they extend further towards the axis A of the collar. They extend against the flanks 10A and 10B of the belt of the collar, beyond the crest 10' of said belt. These extended cheeks contributed to retaining the lugs axially (along the axis A of the collar) relative to the belt of the collar. Per se, they contribute to retaining the extensions axially, but, insofar as these cheeks are themselves retained between the lips of the front portions of the lugs (the lips 15A and 115A being visible), they enable the lugs to be retained, including in their front portions.

Before the collar is tightened, in the situations shown in FIGS. 1, 6, and 8, the radius of curvature r of the link loops 20, 20', 20" or indeed 120 is substantially equal to the radius rt of the tightening rod 16. In accordance with the invention, the radius of curvature of the link loop(s) prior to tightening preferably lies in the range 0.25 times said radius rt to 1.5 times said radius rt.

The invention claimed is:

1. A clamping collar having a substantially cylindrical metal belt, a pair of projecting lugs having respective facing front portions, a tightening rod disposed in holes in said lugs, and two tightening members co-operating with said rod and with respective ones of bearing portions of the two lugs in the pair to move the lugs closer together in such a manner as to cause the belt to be tightened by reducing a diameter of said belt, the bearing portion of at least a first one of the lugs being formed in an extension of said first lug, which extension is folded over towards a rear of said first lug, away from a second lug in the pair, and is provided with a hole for the tightening rod, said hole being situated facing a hole in the front portion of the first lug, a bracing space being provided between the folded-over extension and said front portion of the first lug, the extension and the front portion of the first lug being interconnected via a strip portion forming a link loop defining an axial tunnel having two open axial ends, said tunnel being shaped so that an angle of inclination between the extension and the front portion of the first lug can change when the collar is tightened, and wherein the tightening rod is threaded, and the hole in the extension of the first lug has a tapped neck co-operating, by screwing, with the tightening rod while said rod is mounted loosely through the hole in the front portion of said first lug.

2. The clamping collar according to claim 1, wherein one of elements constituted by the extension and by the front portion of the first lug carries at least one holding tab folded over into the tunnel via one of it's the open axial ends thereof.

3. The clamping collar according to claim 1, wherein at least one of elements constituted by the extension and by the front portion of the first lug has at least one bracing cheek that extends towards other of said elements, substantially parallel to the tightening rod.

4. The clamping collar according to claim 3, wherein the extension has two bracing side cheeks, while the front portion of the first lug has two stiffening lips that extend towards the extension and that are formed on respective ones of two axially opposite edges of said front portion, and free edges of the bracing side cheeks extend against inside faces of respective ones of said lips.

5. The clamping collar according to claim 1, wherein the belt of the collar is of convex section as seen from an outside, and the extension has two bracing side cheeks that extend towards an axis of the collar beyond a crest of said convex section, on either side of said crest.

6. The clamping collar according to claim 1, wherein the extension has bracing cheeks formed by die-stamping.

7. The clamping collar according to claim 1, wherein the hole in the front portion of the first lug has a skirt forming a bearing for the tightening rod.

8. The clamping collar according to claim 1, wherein the link loop has greater flexibility than the extension and than the front portion of the first lug.

9. The clamping collar according to claim 1, wherein when the collar is in a non-tightened state, the open axial ends of the tunnel defined by the link loop have a radius of curvature lying in a range 0.25 times a radius of the tightening rod to 1.5 times the radius of said tightening rod.

10. The clamping collar according to claim 1, wherein the link loop is suitable for being broken.

11. A clamping collar having a substantially cylindrical metal belt, a pair of projecting lugs having respective facing front portions, a tightening rod disposed in holes in said lugs, and two tightening members co-operating with said rod and with respective ones of bearing portions of the two lugs in the pair to move the lugs closer together in such a manner as to cause the belt to be tightened by reducing a diameter of said belt, the bearing portion of at least a first one of the lugs being formed in an extension of said first lug, which extension is folded over towards a rear of said first lug, away from a second lug in the pair, and is provided with a hole for the tightening rod, said hole being situated facing a hole in the front portion of the first lug, a bracing space being provided between the folded-over extension and said front portion of the first lug, the extension and the front portion of the first lug being interconnected via a strip portion forming a link loop defining an axial tunnel having two open axial ends, said tunnel being shaped so that an angle of inclination between the extension and the front portion of the first lug can change when the collar is tightened, and wherein the extension has two bracing side cheeks, while the front portion of the first lug has two stiffening lips that extend towards the extension and that are formed on respective ones of two axially opposite edges of said front portion, and free edges of the bracing side cheeks extend against inside faces of respective ones of said lips.

12. A clamping collar having a substantially cylindrical metal belt, a pair of projecting lugs having respective facing front portions, a tightening rod disposed in holes in said lugs, and two tightening members co-operating with said rod and with respective ones of bearing portions of the two lugs in the pair to move the lugs closer together in such a manner as to cause the belt to be tightened by reducing a diameter of said belt, the bearing portion of at least a first one of the lugs being formed in an extension of said first lug, which extension is folded over towards a rear of said first lug, away from a second lug in the pair, and is provided with a hole for the tightening rod, said hole being situated facing a hole in the front portion of the first lug, a bracing space being provided between the folded-over extension and said front portion of the first lug, the extension and the front portion of the first lug being interconnected via a strip portion forming a link loop defining an axial tunnel having two open axial ends, said tunnel being shaped so that an angle of inclination between the extension and the front portion of the first lug can change when the collar is tightened, and wherein the front portion of the first lug has two stiffening lips that extend towards the extension and are formed on respective ones of two axially opposite edges of said front portion, and an end of each lip that is further from an axis of the collar carries a holding tab that is folded over into the axial tunnel.

13. The clamping collar according to claim 12, wherein the extension has bracing cheeks formed by die-stamping.

14. The clamping collar according to claim 12, wherein the hole in the front portion of the first lug has a skirt forming a bearing for the tightening rod.

15. A clamping collar having a substantially cylindrical metal belt, a pair of projecting lugs having respective facing front portions, a tightening rod disposed in holes in said lugs, and two tightening members co-operating with said rod and with respective ones of bearing portions of the two lugs in the pair to move the lugs closer together in such a manner as to cause the belt to be tightened by reducing a diameter of said belt, the bearing portion of at least a first one of the lugs being formed in an extension of said first lug, which extension is folded over towards a rear of said first lug, away from a second lug in the pair, and is provided with a hole for the tightening rod, said hole being situated facing a hole in the front portion of the first lug, a bracing space being provided between the folded-over extension and said front portion of the first lug, the extension and the front portion of the first lug being interconnected via a strip portion forming a link loop defining an axial tunnel having two open axial ends, said tunnel being shaped so that an angle of inclination between the extension and the front portion of the first lug can change when the collar is tightened, and wherein the link loop has a width, measured in an axial direction of the collar, that is less than widths of the extension and of the front portion of the first lug.

16. The clamping collar according to claim 15, wherein the second lug in the pair also has an extension and is shaped analogously to the first lug.

17. The clamping collar according to claim 15, wherein at least one of elements constituted by the extension and by the front portion of the first lug has at least one bracing cheek that extends towards other of said elements, substantially parallel to the tightening rod.

18. The clamping collar according to claim 15, wherein the belt of the collar is of convex section as seen from an outside, and the extension has two bracing side cheeks that extend towards an axis of the collar beyond a crest of said convex section, on either side of said crest.

19. The clamping collar according to claim 15, wherein the extension has bracing cheeks formed by die-stamping.

20. The clamping collar according to claim 15, wherein the hole in the front portion of the first lug has a skirt forming a bearing for the tightening rod.

* * * * *